United States Patent [19]
Herzberg

[11] Patent Number: 5,443,893
[45] Date of Patent: Aug. 22, 1995

[54] MULTILAYER NONWOVEN THERMAL INSULATING BATTS

[75] Inventor: Carol E. Herzberg, Afton, Minn.

[73] Assignee: Minnesota Mining and Manufacturing Company, St. Paul, Minn.

[21] Appl. No.: 247,216

[22] Filed: May 20, 1994

[51] Int. Cl.$^6$ ............................................. B23B 27/12
[52] U.S. Cl. ................................... 428/198; 428/110; 428/111; 428/192; 428/194; 428/196; 428/215; 428/225; 428/232; 428/282; 428/288; 428/296; 428/298
[58] Field of Search ............... 428/296, 110, 111, 192, 428/194, 196, 198, 215, 225, 232, 282, 288, 297, 298

[56] References Cited

U.S. PATENT DOCUMENTS

| | | | |
|---|---|---|---|
| Re. 30,955 | 6/1982 | Stanistreet | 156/308 |
| 3,905,057 | 9/1975 | Willis et al. | 5/337 |
| 4,068,036 | 1/1978 | Stanistreet | 428/296 |
| 4,118,531 | 10/1978 | Hauser | 428/224 |
| 4,128,678 | 12/1978 | Metcalfe et al. | 428/119 |
| 4,392,903 | 7/1983 | Endo et al. | 156/167 |
| 4,481,256 | 11/1984 | Masuda et al. | 428/362 |
| 4,588,635 | 5/1986 | Donovan | 428/288 |
| 4,837,067 | 6/1989 | Carey, Jr. et al. | 428/108 |
| 4,950,541 | 8/1990 | Tabor et al. | 428/373 |
| 4,992,327 | 2/1991 | Donovan et al. | 428/296 |
| 5,114,787 | 5/1992 | Chaplin et al. | 428/284 |
| 5,141,805 | 8/1992 | Nohara et al. | 428/296 |
| 5,256,050 | 10/1993 | Davies | 425/131 |

Primary Examiner—Patrick J. Ryan
Assistant Examiner—Richard P. Weisberger
Attorney, Agent, or Firm—Gary L. Griswold; Walter N. Kirn; Carole Truesdale

[57] ABSTRACT

A multilayer nonwoven thermal insulating batt is provided. The batt comprises a blend of bonding staple fibers and staple fill fibers, the fibers being formed into a multilayer batt. The bonding fibers are subsequently bonded sparingly to staple fill fibers at the points of contact to enhance the structural stability of the multilayer batt but allow delamination of the individual web layers under mechanical action. Also provided is a method of making a thermal insulating nonwoven multilayer batt comprising the steps of: (a) forming a web of bonding staple fibers and staple fill fibers such that the web has a substantially smooth side and a loose fibrous side; (b) forming a batt of multiple layers of the webs; (c) subjecting the layered batt to sufficient heat to cause bonding of the bonding staple fibers to other bonding staple fibers and staple fill fibers at points of contact within each layer and sufficient bonding between each layer to stabilize the batt yet permit delamination of the layers when the batt is subjected to mechanical action.

9 Claims, 1 Drawing Sheet

MULTILAYER NONWOVEN THERMAL INSULATING BATTS

FIELD OF THE INVENTION

The present invention relates to improved insulating and cushioning structures made from synthetic fibrous materials and more particularly to thermal insulating materials having the insulating performance, conformability and feel of down.

BACKGROUND OF THE INVENTION

A wide variety of natural and synthetic filling materials for thermal insulation applications, such as outerwear apparel, e.g. jackets, stocking caps, and gloves, sleeping bags and bedding articles, e.g., pillows, comforters, quilts, and bedspreads, are known.

Natural feather down has found wide acceptance for thermal insulation applications, primarily because of its outstanding weight efficiency, softness, and resiliency. Properly fluffed and contained within an article or garment, down is generally recognized as the insulation material of choice. However, down compacts and loses its insulating properties when it becomes wet and can exhibit a rather unpleasant odor when exposed to moisture. Also a carefully controlled cleaning and drying process is required to restore the fluffiness and resultant thermal insulating properties to an article in which the down has compacted.

There have been numerous attempts to prepare synthetic fiber-based structures having the characteristics and structure of down. Attempts have been made to produce substitutes for down by converting the synthetic fibrous materials into insulating batts configured to have fibers that have specific orientations relative to the faces of the batt followed by bonding of the fibers to stabilize the web to afford improved insulating properties.

Such attempts include a pillow formed of an assemblage of generally coplanar fibers encased in a casing, where the fibers are substantially perpendicular to the major axis of the elliptical cross-section of the pillow surfaces to provide a degree of resiliency and fluffability; a thermal insulating material which is a web of blended microfibers with crimped bulking fibers which are randomly and thoroughly intermixed and intertangled with the microfibers to provide high thermal resistance per unit thickness and moderate weight; and a nonwoven thermal insulating batt of entangled staple fibers and bonding staple fibers which are substantially parallel to the faces of the web at the face portions of the web and substantially perpendicular to the faces of the batt in the central portion of the batt with the bonding staple fibers bonded to the structural staple fibers and other bonding staple fibers at points of contact.

Other structures include a blend of 80 to 90 weight percent of spun and drawn, crimped staple synthetic polymeric microfibers having a diameter of 3 to 12 microns and 5 to 20 weight percent of synthetic polymeric staple macrofibers having a diameter of from more than 12 up to 50 microns which is described as comparing favorably to down in thermal insulating properties and a synthetic fiber thermal insulating material in the form of a cohesive fiber structure of an assemblage of from 70 to 95 weight percent of synthetic polymeric microfibers having diameter of from 3 to 12 microns and from 5 to 30 weight percent of synthetic polymeric macrofibers having a diameter of 12 to 50 microns where at least some of the fibers are bonded at their contact points, the bonding being such that the density of the resultant structure is within the range of 3 to 16 $kg/m^3$, the thermal insulating properties of the bonded assemblage being equal to or not substantially less than the thermal insulating properties of the unbonded assemblage. In this assemblage the entire assemblage is bonded together to maintain support and strength to the fine fibers without suffering from the lower thermal capacity of the macrofiber component.

A still further structure suggested for providing a resilient, thermally bonded non-woven fibrous batt includes having uniform compression modulus in one plane which is more than the compression modulus measured in a direction perpendicular to that plane and a substantially uniform density across its thickness. The batt is prepared by forming a batt comprising at least 20% by weight of crimped and/or crimpable conjugate fibers, i.e., bicomponent bonding fibers, having or capable of developing a crimp frequency of less than 10 crimps per extended era, and a decitex in the range of 5 to 30. The batt is thermally bonded by subjecting it to an upward fluid flow heated to a temperature in excess of the softening component of the conjugate fiber to effect inter-fiber bonding.

BRIEF SUMMARY OF THE INVENTION

The present invention provides a nonwoven thermal insulating batt having a blend of bonding staple fibers and staple fill fibers, the fibers being formed into a multilayer batt, the bonding fibers subsequently bonded sparingly to staple fill fibers at the points of contact to enhance the structural stability of the multilayer batt but allow delamination of the individual web layers under mechanical action. The batt may contain staple fill fibers of two or more deniers. Preferably, the layers have a substantially smooth side and a loose fibrous side.

The present invention also provides a method of making a thermal insulating nonwoven multilayer batt comprising the steps of:
  (a) forming a web of bonding staple fibers and staple fill fibers such that the web has a substantially smooth side and a loose fibrous side;
  (b) forming a batt of multiple layers of said webs;
  (c) subjecting said layered batt to sufficient heat to cause bonding of the bonding staple fibers to other bonding staple fibers and staple fill fibers at points of contact within each layer and sufficient bonding between each layer to stabilize the batt yet permit delamination of the layers when the batt is subjected to mechanical action. Preferably, the web is formed by carding and the layering is achieved by cross-lapping the carded web. More preferably, the card is equipped with a single doffing roll and a condensing roll to provide each of the layers with a substantially smooth side and a loose fibrous side.

The nonwoven thermal insulating batt of the present invention has thermal insulating properties, particularly thermal weight efficiencies, about comparable to or exceeding those of down, but without the moisture sensitivity of down. The controlled delamination of individual layers of the multilayer batt increases the drapeability, softness or hand of the batt in conjunction with improved thermal insulating properties compared to web compositions and constructions that do not allow controlled delamination.

Surprisingly, the batt of the present invention exhibits improved thermal insulation properties after use and laundering unlike many other synthetic thermal insulation materials which exhibit degradation of thermal insulating properties after use and laundering. The mechanical properties of the batt of the present invention such as its density, resistance to compressive forces, loft as well as its thermal insulating properties can be varied over a significant range by changing the fiber denier, basis weight, staple fill to bonding fiber length ratio, type of fibers, surface texture of the layer faces, and bonding conditions.

DETAILED DESCRIPTION OF THE INVENTION

Figure 1:
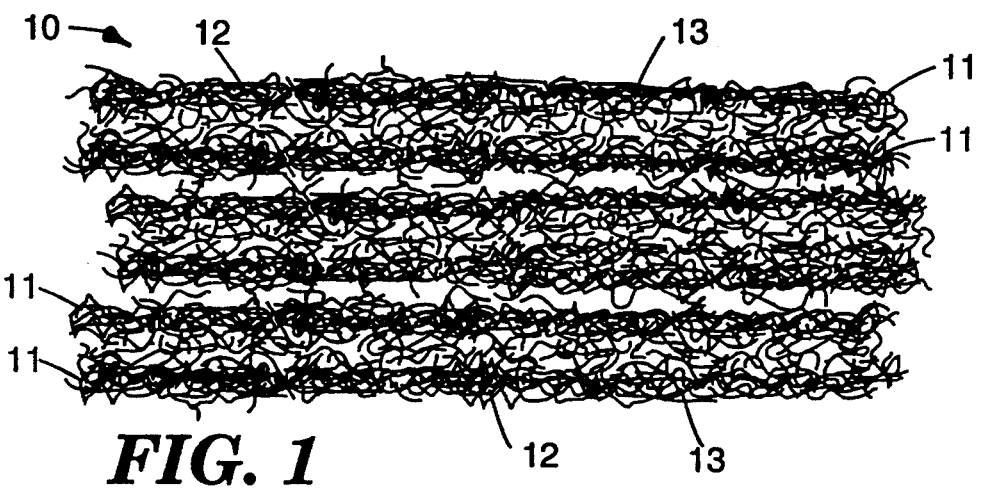
FIG. 1 is a representation of the multilayer structure of a nonwoven thermal insulating batt of the present invention.
Figure 2:
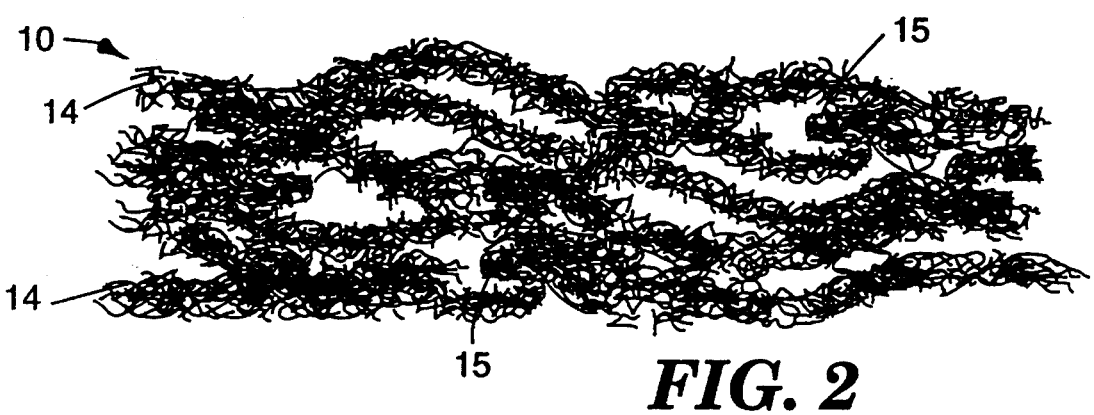
FIG. 2 is a representation of the delaminated multilayer batt of FIG. 1 after the reconfiguration through mechanical action.

The present invention, as shown in FIG. 1 is a nonwoven thermal insulating batt 10 comprised of layers 11 which contain staple fill fibers 12 and staple bonding fibers 13. The bonding fibers bond to other bonding fibers and fill fibers at points of contact within each layer and at the juncture of one layer with another to a sufficient extent that after being subjected to mechanical action, the layers maintain their integrity but delaminate from one another as shown in FIG. 2. Batt 10, as shown in FIG. 2, has been subjected to mechanical action to cause delamination of the layers. The delaminated layers acquire a pattern of waves 15 in each layer which appears to enhance the thermal insulating characteristics of the batt.

Figure 3:
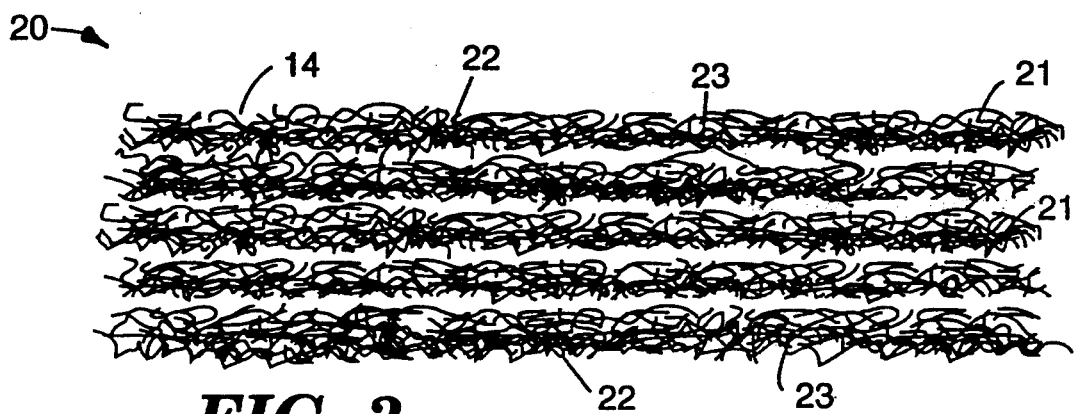
FIG. 3 is another representation of a multilayer nonwoven thermal insulating batt of the present invention.
Figure 4:
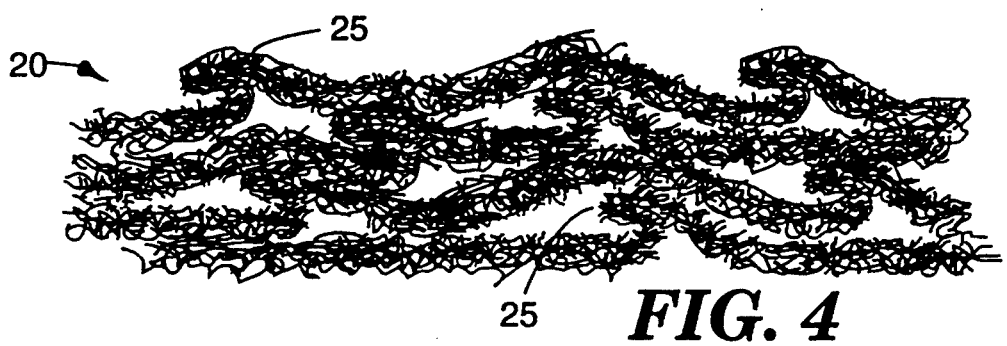
FIG. 4 is a representation of the delaminated multilayer batt of FIG. 3 after reconfiguration through mechanical action.

In FIGS. 3 and 4, a batt 20 is shown before delamination (FIG. 3) and after delamination (FIG. 4). As in the batt shown in FIGS. 1 and 2, the batt 20 is comprised of layers 21 which contain staple fill fibers 22 and staple bonding fibers 23. The bonding fibers bond to other bonding fibers and fill fibers at points of contact within each layer and at the juncture of one layer with another 24 to a sufficient extent that after being subjected to mechanical action, the individual layers maintain their integrity but delaminate from one another as shown in FIG. 4. Batt 20, as shown in FIG. 4, has been subjected to mechanical action as was the batt shown in FIG. 2 to cause delamination of the layers and formation of a pattern of waves 25 within the individual layers.

As shown in FIGS. 1 and 3, in the batt of the invention, both before and after delamination, each layer has a substantially smooth face 16 and a loose fibrous face 17. In this embodiment, smooth face contacts smooth face and fibrous face contacts fibrous face in an alternating manner. In the embodiment shown in FIGS. 3 and 4, the layers each have a substantially smooth face 26 and a loose fibrous face 27 as did each layer shown in the embodiment depicted in FIGS. 1 and 2. However, in this embodiment, the layers contact each other smooth face to loose fibrous face. Of course, the batt may be constructed such that each layer has a substantially smooth face on each side, a loose fibrous face on each side or layers having both faces substantially smooth alternate with layers having loose fibrous faces on each side.

Staple fill fibers, usually single component in nature, which are useful in the present invention include, but are not limited to, polyethylene terephthalate, polyamide, wool, polyvinyl chloride, acrylic and polyolefin, e.g., polypropylene. Both crimped and uncrimped staple fill fibers are useful in preparing the batts of the present invention, although crimped fibers, preferably having 1 to 10 crimps/cm, more preferably having 3 to 5 crimps/cm, are preferred.

The length of the staple fill fibers suitable for use in the batts of the present invention is preferably from 15 mm to about 50 ram, more preferably from about 25 mm to 50 ram, although staple fill fibers as long as 150 mm can be used.

The diameter of the staple fill fibers may be varied over a broad range. However, such variations alter the physical and thermal properties of the stabilized batt. Generally, finer denier fibers increase the thermal insulating properties of the batt, while larger denier fibers decrease the thermal insulating properties of the batt. Useful fiber deniers for the staple fill fibers preferably range from about 0.2 to 15 denier, more preferably from about 0.5 to 5 denier, most preferably 0.5 to 3 denier. Blends or mixtures of fiber deniers may be used to obtain desired thermal and mechanical properties as well as excellent hand of the stabilized batt. Finer denier staple fibers of up to about 4 denier provide improved thermal resistance, drape, softness and hand which show more enhancement as the denier is reduced. Larger denier fibers of greater than about 4 denier provide the batt with greater strength, cushioning and resilience with greater enhancement of these properties with increasing fiber denier.

A variety of bonding fibers are suitable for use in stabilizing the batts of the present invention, including amorphous, meltable fibers, adhesive coated fibers which may be discontinuously coated, and bicomponent bonding fibers which have an adhesive component and a supporting component arranged in a coextensive side-by-side, concentric sheath-core, or elliptical sheath-core configuration along the length of the fiber with the adhesive component forming at least a portion of the outer surface of the fiber. The adhesive component of the bondable fibers is preferably thermally bonded. The adhesive component of thermally bonding fibers must be thermally activatable (i.e., meltable) at a temperature below the melt temperature of the staple fill fibers of the batt. A range of bonding fiber sizes, e.g. from about 0.5 to 15 denier are useful in the present invention, but optimum thermal insulation properties are realized if the bonding fibers are less than about four denier and preferably less than about two denier in size. As with the staple fill fibers, smaller denier bonding fibers increase the thermal insulating properties, while larger denier bonding fibers decrease the thermal insulating properties of the batt. As with the staple fill fibers, a blend of bonding fibers of two or more denier can also be used.

The length of the bonding fibers is preferably about 15 mm to 75 mm, more preferably about 25 mm to 50 ram, although fibers as long as 150 mm are useful. Preferably, the bonding fibers are crimped, having 1 to 10 crimps/cm, more preferably having 3 to 5 crimps/cm. Of course, adhesive powders and sprays can also be used to bond the staple fill fibers, although difficulties in obtaining even distribution throughout the web reduces their desirability.

One particularly useful bonding fiber for stabilizing the batts of the present invention is a crimped sheath-core bonding fiber having a core of crystalline polyethylene terephthalate surrounded by a sheath of an adhesive polymer of an activated copolyolefin. The sheath is heat softenable at a temperature lower than the core material. Such fibers, available from Hoechst Celanese Corporation, are particularly useful in preparing the batts of the present invention and are described in U.S. Pat. Nos. 5,256,050 and 4,950,541. Other sheath/core adhesive fibers may be used to improve the properties of the present invention. Representative examples include fibers having a higher modulus core to improve the resilience of the batt or fibers having sheaths with better solvent tolerance to improve dry cleanability of the batts.

The amounts of staple fill fiber and bonding staple fiber in the batts of the present invention can vary over a wide range. The fiber length ratio of staple fill fibers to staple bonding fibers in the batt may be calculated according to the following formula:

$$\text{Fiber length ratio} = \frac{\sum_{a}^{n} (\text{weight percent staple fill fiber})_a \left(\frac{9}{\text{fill fiber denier}}\right)_a}{\sum_{b}^{n} (\text{weight percent staple bonding fiber})_b \left(\frac{9}{\text{bonding fiber denier}}\right)_b}$$

The staple fill fiber to staple bonding fiber length ratio is preferably at least about 2:1, more preferably at least about 2:5, and most preferably at least about 5:1. Generally, the fiber length ratio preferably does not exceed about 10 to 15:1 or the integrity of the batt is insufficient.

The nonwoven thermal insulating batts of the invention are capable of providing thermal weight efficiencies of preferably at least about 15 clo/kg/m², more preferably at least 20 clo/kg/m² most preferably at least about 25 clo/kg/m² and radiation parameters of less than about 20 (W/mK)(kg/m³)(100), more preferably less than about 15 (W/mK)(kg/m³)(100), more preferably less than 10 (W/mK)(kg/m³)(100).

The nonwoven batts of the present invention preferably have a bulk density of less than about 0.1 g/cm³, more preferably less than about 0.005 g/cm³, most preferably less than about 0.003 g/cm³. Effective thermal insulating properties are achievable with bulk densities as low as 0.001 g/cm³ or less. To attain these bulk densities, the batts preferably have a thickness in the range of about 0.5 to 15 cm, more preferably 1 to 10 cm, most preferably 2 to 8 cm, and preferably have a basis weight from 20 to 400 g/m², more preferably 80 to 300 g/m², most preferably 100 to 200 g/m². Generally the thickness of the delaminated batt is about 25 to 40 percent greater than before delamination, although the weight remains substantially constant.

The webs which comprise the layers of the batt of the invention can be prepared using any conventional web forming process including carding, garnetting, air laying, e.g., by Rando-Webber ™, etc. Carding is generally preferred. Each layer is preferably about 1 to 60 mm thick, more preferably 3 to 20 mm thick and preferably has a basis weight of about 5 to 300 g/m², more preferably about 10 to 30 g/m².

In preferred embodiments of the invention, each layer of the web has a substantially smooth surface and a loose fibrous surface. The loose fibrous surface which is of lower density contributes to the thickness and thermal resistance of the batt. The substantially smooth surface permits less bonding between adjoining layers due to less intermeshing of fibers and, thus, contributes to controlled delamination under mechanical action.

The means of forming the layered batt is not critical. The layers may be formed by cross-lapping, layering multiple doffs, by ganging web formers or any other layering technique. The batts of the invention may contain up to about 100 layers, but generally contains about 10 to 60 layers.

Thermal bonding may be carried out by any means which can achieve adequate bonding of the staple bonding fibers to provide adequate structural stability. Such means include, but are not limited to, conventional hot air ovens, microwave, or infrared energy sources.

Delamination of the batt may be carried out using any mechanical action sufficient to cause the layers to delaminate but which is insufficient to cause destruction of the individual layers. Typical examples of such mechanical action include laundering or merely the action of a rotating dryer in the presence of solid objects such as tennis balls.

In the Examples which follow, the following test methods were used.

Thickness

Thickness of each batt was determined by applying a 13.8 Pa (0.002 psi) force on the face utilizing a Low Pressure Thickness Gauge Model No. CS-49-46 available from Custom Scientific Instruments Inc.

Density

The volume of a sample of each batt was determined by fixing two planar sample dimensions and measuring the thickness as described above. The density of the sample was determined by dividing mass by volume.

Delaminated Layers

The number of delaminated layers in a sample after laundering or other mechanical action is visually observed with an average of three samples being reported.

Thermal Resistance

Thermal resistance of the batts was determined according to ASTM-D-1518-85 to determine the combined heat loss due to convection, conduction and radiation mechanisms.

Radiation Parameter

The radiation parameter is calculated using the formula:

$$\text{Radiation Parameter} = K_{obs}P_{web} - K_{air}P_{web}$$

where
$K_{obs}$ = apparent thermal conductivity of the batt
$P_{web}$ = density of the web
$K_{air}$ = thermal conductivity of still air, i.e., 0.025 W/m° K

Laundering

Laundering of each batt example was performed on $3.123 \times 10^3$ cm² panels of batting placed between two layers of 100% cotton muslin fabric having a thread count of 76×80 and a basis weight of 100 g/m² and the edges of the cotton outer fabric were secured by sewing. The test panels were washed in a top loading Kenmore ™ 70 Series washer (available from Sears Corporation) for 41 minutes continuous agitation (equal to 5 individual cycles) in cold water (20° C.) utilizing a delicate cycle followed by a normal rinse and spin and dried for 45 minutes at low heat setting of the delicate cycle with a Kenmore ™ Soft Heat Model No. 86477110 heavy duty dryer.

Hand

The hand of each batt was evaluated and ranked on a scale of ranging from poor, fair, good, to excellent.

The following examples further illustrate this invention, but the particular materials, and amounts thereof in these examples, as well as other conditions and details should not be construed to unduly limit this invention. In the examples, all parts and percentages are by weight unless otherwise specified.

EXAMPLES 1–3

In Example 1, staple fill fibers (55 weight percent Trevira ™ Type 121 polyethylene terephthalate, 1.2 denier, 3.8 cm long, available from Hoechst Celanese Corp.) and bonding fibers (45 weight percent core/sheath fiber prepared according to U.S. Pat. Nos. 4,950,541 and 5,256,050, having a core of crystalline polyethylene terephthate surrounded by a sheath of an adhesive polymer of copolyolefin, 2.2 denier, 2.54 cm long) to provide a fiber length ratio of staple fill fiber to staple bonding fibers of 2.2 were opened and mixed using a Cromtex ™ opener, available from Hergeth Hollingsworth, Inc. The fibers were conveyed to a carding machine that utilized a single doffing roll and a single condensing roll such that the card provided a web having one side on which the fiber are oriented primarily in the machine direction to provide a substantially smooth surface while on the other surface the fibers are oriented in a more vertical direction to provide a loose fibrous character. The doffed web was then cross-lapped conventionally to configure a 12 lap, 24 layer multilayer web. Each web was then passed through an air circulating oven at 218° C. at a rate of 1.68 meters per minute to achieve a stabilized batt having a basis weight of 125 g/m².

In Example 2, a batt was prepared as in Example 1 except the fiber content was staple fill fibers (22 weight percent Trevira ™ Type 121 polyethylene terephthalate, 1.2 denier, 3.8 cm long, and 44 weight percent Trevira ™ Type 121 polyethylene terephthalate, 0.85 denier, 3.8 cm long, each available from Hoechst Celanese Corp.) and staple bonding fibers (34 weight percent of the core/sheath fiber used in Example 1) to provide a staple fill fiber to staple bonding fiber length ratio of 4.5:1.

In Example 3, a batt was prepared as in Example 1 except the fiber content was staple fill fibers (25 weight percent Trevira ™ Type 121 polyethylene terephthalate, 1.2 denier, 3.8 cm long, and 50 weight percent Trevira ™ Type 121 polyethylene terephthalate, 0.85 denier, 3.8 cm long, each available from Hoechst Celanese Corp.) and staple bonding fibers (25 weight percent of the core/sheath fiber used in Example 1) to provide a staple fill fiber to staple bonding fiber length ratio of 7:1.

Samples of each Example were vacuum packed to 25% of their original volume for 1 week to simulate shipping conditions and allowed to recover for 24 hours prior to testing. Samples were then tested for basis weight, bulk density, thickness, thermal resistance. Samples were configured into test panels for laundering as described above. Following laundering the examples were evaluated for delamination from the original single layer configuration as well as for thickness, thermal resistance, radiation parameter, thermal weight efficiency and hand. The test results as well as the staple fill fiber to staple bonding fiber length ratios are set forth in Table I.

TABLE I

| Example | 1 | 2 | 3 |
| --- | --- | --- | --- |
| Basis Weight (g/m³) | 125 | 135 | 139 |
| Fill:Bonding Fiber Length Ratio | 2.2:1 | 4.5:1 | 7:1 |
| Bulk Density (kg/m³) | | | |
| Initial | 4.3 | 4.9 | 4.6 |
| After Laundering | 3.0 | 3.5 | 3.3 |
| Thickness (cm) | | | |
| Initial | 2.9 | 2.8 | 3.0 |
| After Laundering | 4.1 | 3.9 | 4.3 |
| Thermal Resistance (clo) | | | |
| Initial | 3.2 | 2.6 | 3.7 |
| After Laundering | 3.8 | 4.8 | 5.0 |
| Delaminated Layers After Laundering | 2.0 | 3.8 | 4.5 |
| Radiation Parameter (W/mK)(kg/m³) × 100 | | | |
| Initial | 14.4 | 21.4 | 12.6 |
| After Laundering | 13.5 | 9.5 | 9.9 |
| Thermal Weight Efficiency (clo/kg/m²) | | | |
| Initial | 25.6 | 19.3 | 27.4 |
| After Laundering | 30.4 | 35.6 | 36.0 |
| Hand | | | |
| Initial | Good | Good | Good |
| After Laundering | Excellent | Excellent | Excellent |

As can be seen from the data in Table I, the thermal insulating batts of the invention have excellent thermal resistance and exceptionally good hand or softness to the construction. With increased fill fiber to bonding fiber length ratio both the thermal resistance and the thermal weight efficiency increased. The batts also demonstrated low values of the radiation parameter thereby indicating low heat loss due to thermal radiation.

EXAMPLES 4–6 AND COMPARATIVE EXAMPLES C1–C3

Example 4 was prepared as in Example 1, except having a basis weight of 173 g/m². Example 5 was prepared as in Example 2, except having a basis weight of 176 g/m². Example 6 was prepared as in Example 3, except having a basis weight of 179 g/m². Comparative Examples were prepared as in Example 1 except the amounts and types of fibers as follows:

Comparative Example 1: staple fill fiber (55 weight percent Trevira ™ Type 295 polyethylene terephthalate fiber, 6.0 denier, 3.81 cm long) and staple bonding fiber (45 weight percent core/sheath fiber as used in Example 1.

Comparative Example 2: staple fill fiber (27.5 weight percent Trevira ™ Type 121 polyethylene terephthalate fiber, 1.2 denier, 3.81 cm long and 27.5 weight percent Trevira TM Type 295, a polyethylene terephthalate fiber, 6.0 denier, 3.81 cm long, available from Hoechst Celanese Corp.) and staple bonding fiber (45 weight percent core/sheath fiber as used in Example 1).

Comparative Example 3: staple bonding fiber (27.5 weight percent Trevira TM Type 121 polyethylene terephthalate fiber, 0.85 denier, 3.81 cm long, and 27.5 weight percent Trevira TM Type 295 polyethylene terephthalate fiber, 6.0 denier, 3.81 cm long) and staple bonding fiber (45 weight percent core/sheath fiber as used in Example 1).

Samples of each batt produced were tested as in Examples 1–3. The results as well as the staple fill fiber to staple bonding fiber length ratios are set forth in Table II.

ple 8, a batt was prepared as in example 3, except having a basis weight of 145 g/m².

In Comparative Examples C4–C8 various commercially available thermal insulating materials were evaluated using the test methods used on Examples 7 and 8. The materials were as follows: Comparative Example C4—Goose Down 600 available from Company Store, Lacrosse, Wis,; Comparative Example C5—Primaloft TM, available from Albany International Corp., Albany, N.Y.; Comparative Example C6—Comforel TM, available from DuPont, Inc., Wilmington, Del.; Comparative Example C7—Kod-O-Fil TM, available from Eastman Chemical Co., San Mateo, Calif.; and Comparative Example C8—Thermoloft TM, available from DuPont, Inc. Test results are set forth in Table III.

TABLE II

| Example | 4 | 5 | 6 | C1 | C2 | C3 |
|---|---|---|---|---|---|---|
| Basis Weight (g/m³) | 173 | 176 | 179 | 263 | 199 | 223 |
| Fill:Bonding Fiber Length Ratio | 2.2:1 | 4.5:1 | 7:1 | 0.5:1 | 1.3:1 | 1.8:1 |
| Bulk Density (kg/m³) | | | | | | |
| Initial | 4.7 | 4.8 | 4.5 | 5.8 | 4.5 | 5.6 |
| After Laundering | 3.7 | 3.6 | 3.4 | 5.3 | 4.3 | 5.4 |
| Thickness (cm) | | | | | | |
| Initial | 3.7 | 3.7 | 4.0 | 4.5 | 4.4 | 4.0 |
| After Laundering | 4.7 | 5.0 | 5.2 | 5.0 | 4.7 | 4.1 |
| Thermal Resistance (clo) | | | | | | |
| Initial | 3.9 | 4.4 | 4.6 | 4.7 | 4.3 | 4.4 |
| After Laundering | 4.9 | 5.2 | 6.1 | 5.0 | 4.2 | 4.1 |
| Delaminated Layers After Laundering | 2.2 | 4.3 | 5.7 | 1.0 | 1.0 | 1.0 |
| Radiation Parameter (W/mK)(kg/m³) × 100 | | | | | | |
| Initial | 16.7 | 14.3 | 13.7 | 21.6 | 18.8 | 18.6 |
| After Laundering | 13.8 | 12.9 | 10.4 | 21.1 | 19.9 | 21.6 |
| Thermal Weight Efficiency (clo/kg/m²) | | | | | | |
| Initial | 22.5 | 25.0 | 25.9 | 17.8 | 21.4 | 19.8 |
| After Laundering | 28.3 | 29.5 | 33.9 | 18.9 | 21.1 | 18.4 |
| Hand | | | | | | |
| Initial | Good | Good | Good | Good | Good | Good |
| After Laundering | Excel. | Excel. | Excel. | Good | Good | Good |

EXAMPLES 7 & 8 AND COMPARATIVE EXAMPLES C4–C8

In Example 7, a batt was prepared as in Example 2, except having a basis weight of 151 g/m² and in Example Table III.

TABLE III

| Example | 7 | 8 | C4 | C5 | C6 | C7 | C8 |
|---|---|---|---|---|---|---|---|
| Basis Weight (g/m³) | 151 | 145 | 237 | 306 | 278 | 146 | 324 |
| Fill:Bonding Fiber length Ratio | 4.5:1 | 7:1 | — | — | — | — | — |
| Bulk Density (kg/m³) | | | | | | | |
| Initial | 4.8 | 4.6 | 4.0 | 7.8 | 7.2 | 6.6 | 8.8 |
| After Laundering | 3.7 | 3.4 | 3.6 | 6.2 | 5.3 | 5.9 | 6.7 |
| Thickness (cm) | | | | | | | |
| Initial | 3.1 | 3.1 | 6.0 | 3.9 | 3.9 | 2.2 | 3.7 |
| After Laundering | 4.1 | 4.4 | 6.6 | 4.9 | 5.3 | 2.5 | 4.9 |
| Thermal Resistance (clo) | | | | | | | |
| Initial | 3.6 | 3.9 | 7.4 | 5.3 | 5.5 | 2.3 | 4.4 |
| After Laundering | 5.0 | 4.9 | 7.5 | 5.8 | 6.3 | 2.2 | 4.7 |
| Delaminated Layers After Laundering | 3.2 | 4.0 | — | — | — | — | — |
| Radiation Parameter (W/mK)(kg/n³) × 100 | | | | | | | |
| Initial | 14.9 | 12.4 | 10.8 | 18.0 | 14.6 | 31.1 | 25.6 |
| After Laundering | 10.6 | 10.7 | 11.5 | 18.5 | 15.2 | 35.4 | 28.0 |
| Thermal Weight Efficiency (clo/kg/m²) | | | | | | | |
| Initial | 23.8 | 26.9 | 31.1 | 17.3 | 19.8 | 15.8 | 13.5 |
| After Laundering | 32.5 | 33.8 | 31.5 | 18.9 | 22.8 | 14.7 | 14.4 |
| Hand | | | | | | | |
| Initial | Good | Good | Excel. | Good | Good | Poor | Fair |

TABLE III-continued

| Example | 7 | 8 | C4 | C5 | C6 | C7 | C8 |
|---|---|---|---|---|---|---|---|
| After Laundering | Excel. | Excel. | Excel. | Good | Good | Poor | Poor |

As can be seen from the data in Table III, the batt of Examples 7 and 8 of the invention had greater thermal weight efficiency initially and after laundering than the comparative thermal insulating materials except for goose down, Comparative Example C4. Example 8 exhibited excellent softness or hand which was comparable to goose down, Comparative Example C4.

EXAMPLES 9 AND 10

In Examples 9 and 10, a batt was prepared as in Example 1 except the fiber content was staple fill fiber (68 weight percent Trevira ™ Type 121 polyethylene terephthalate, 1.2 denier, 3.8 cm long) and staple bonding fiber (32 weight percent core/sheath fiber having a core of crystalline polyethylene terephthalate surrounded by a sheath of adhesive polymer of copolyolefin, 3 denier, 2.5 cm long prepared according to U.S. Pat. Nos. 4,950,541 and 5,256,050). In Example 9, the batt was tested as in Example 1. In Example 10, the batt was tested as in Example 1 except the batt was not laundered after one week of storage and 24 hours recovery time but three samples which had been layered with muslin and stitched around the perimeter as in the laundering test and subjected to four hours in dryer (Kenmore ™ Soft Heat Model No. 86477110 heavy duty dryer) at the low heat setting of the delicate cycle with 2 tennis balls. The results are set forth in Table IV.

TABLE IV

| Example | 9 | 10 |
|---|---|---|
| Basis Weight (g/m³) | 259 | 259 |
| Fill:Bonding Fiber Length Ratio | 10.2 | 10.2 |
| Bulk Density (kg/m³) | | |
| Initial | 6.2 | 6.5 |
| After Laundering | 5.0 | — |
| After Tumbling | — | 4.3 |
| Thickness (cm) | | |
| Initial | 4.2 | 4.0 |
| After Laundering | 5.2 | — |
| After Tumbling | — | 6.0 |
| Thermal Resistance (clo) | | |
| Initial | 5.3 | 5.7 |
| After Laundering | 5.7 | — |
| After Tumbling | — | 7.1 |
| Delamination Layers | 5.0 | 5.0 |
| After Laundering | | |
| Radiation Parameter (W/mK)(kg/n³) × 100 | | |
| Initial | 16.1 | 13.1 |
| After Laundering | 16.9 | — |
| After Tumbling | — | 12.8 |
| Thermal Weight Efficiency | | |
| Initial | 20.5 | 22.0 |
| After Laundering | 22.0 | — |
| After Tumbling | — | 27.4 |
| Hand | | |
| Initial | Good | Good |
| After Laundering | Excellent | — |
| After Tumbling | — | Excellent |

What is claimed is:

1. A nonwoven thermal insulating batt comprising a blend of bonding staple fibers and staple fill fibers, the fibers having a fiber length ratio of staple fill fibers to staple bonding fibers of at least 2:1 and the fibers being formed into a multilayer batt, the bonding fibers subsequently bonded sparingly to staple fill fibers at the points of contact to enhance the structural stability of the multilayer batt but allow delamination of the individual web layers under mechanical action.

2. The nonwoven thermal insulating batt of claim 1 wherein said batt contains staple fill fibers of two or more deniers.

3. The nonwoven thermal insulating batt of claim 1 wherein said batt contains staple bonding fibers of two or more deniers.

4. The nonwoven thermal insulating batt of claim 1 wherein the layers have a substantially smooth side and a loose fibrous side.

5. The nonwoven thermal insulating batt of claim 1 wherein said delaminated batt has a thermal weight efficiency of at least 15 clo/kg/m².

6. The nonwoven thermal insulating batt of claim 1 wherein said delaminated batt has a radiation parameter of less than about 20 (W/mK) (kg/m³)(100).

7. The nonwoven thermal insulating batt of claim 1 wherein said delaminated batt has a bulk density of less than about 0.1 g/cm².

8. The nonwoven thermal insulating batt of claim 1 wherein said delaminated batt has a thickness in the range of about 0.5 to 15 cm.

9. The nonwoven thermal insulating batt of claim 1 wherein said delaminated batt has a thickness about 25 to 40% greater than that of the batt prior to delamination.

* * * * *

UNITED STATES PATENT AND TRADEMARK OFFICE
CERTIFICATE OF CORRECTION

PATENT NO. : 5,443,893
DATED : August 22, 1995
INVENTOR(S) : Carol E. Herzberg

It is certified that error appears in the above-indentified patent and that said Letters Patent is hereby corrected as shown below:

Col. 2, line 22            "era," should read -- cm, --

Col. 4, lines 16, 17 and 65 in each instance, "ram," should read --mm,--

Signed and Sealed this

Twenty-first Day of May, 1996

Attest:

BRUCE LEHMAN

*Attesting Officer*        *Commissioner of Patents and Trademarks*